(12) United States Patent
Council et al.

(10) Patent No.: US 9,533,214 B2
(45) Date of Patent: Jan. 3, 2017

(54) GAMING SYSTEM AND METHOD FOR PROVIDING PLAYS OF MULTIPLE GAMES

(71) Applicant: IGT, Reno, NV (US)

(72) Inventors: Shannon L. Council, Reno, NV (US);
Paul S. Heenan, Reno, NV (US);
Shawn A. Hupp, Reno, NV (US);
Gilbert F. Leiker, Reno, NV (US);
Kimberley K. Maya, Reno, NV (US);
Alejandro Parrilla Pereira, Reno, NV (US); Adam C. Rud, Reno, NV (US);
Oscar E. Salgado, Kings Beach, CA (US); Corey E. Stisser, Reno, NV (US); Shenea A. Strader, Reno, NV (US); Jae M. Yi, Reno, NV (US)

(73) Assignee: IGT, Las Vegas, NV (US)

( * ) Notice: Subject to any disclaimer, the term of this patent is extended or adjusted under 35 U.S.C. 154(b) by 191 days.

(21) Appl. No.: 13/626,360

(22) Filed: Sep. 25, 2012

(65) Prior Publication Data

US 2014/0087841 A1  Mar. 27, 2014

(51) Int. Cl.
*A63F 13/00* (2014.01)
*G07F 17/32* (2006.01)

(52) U.S. Cl.
CPC ........... *A63F 13/00* (2013.01); *G07F 17/3244* (2013.01)

(58) Field of Classification Search
CPC ... G07F 17/32; G07F 17/3244; G07F 17/3258
USPC .................................................... 463/16–20
See application file for complete search history.

(56) References Cited

U.S. PATENT DOCUMENTS

| 2,812,182 | A | 11/1957 | James |
| 3,834,712 | A | 9/1974 | Cox |
| 4,093,215 | A | 6/1978 | Ballard |
| 4,184,683 | A | 1/1980 | Hooker |

(Continued)

FOREIGN PATENT DOCUMENTS

| EP | 0 464 935 | 1/1992 |
| EP | 0 945 837 | 9/1999 |

(Continued)

OTHER PUBLICATIONS

Angel or Devil Online Slot, printed from: http://online.casinocity.com/slots/game/angel-or-devil/ on Feb. 19, 2013, available prior to Sep. 25, 2012.

(Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

In various embodiments, the gaming system and method disclosed herein enables a player to allocate portions of a selected predetermined wager amount amongst a plurality of linked games. In one such embodiment, the player selects allocation percentages such that the total of the allocated portions according to the allocation percentages equals the selected predetermined wager amount. For each of the plurality of linked games, the gaming system determines and displays a game outcome, and determines and displays an award associated with the determined game outcome. The gaming system further provides the determined award for each of the plurality of linked games to the player.

30 Claims, 11 Drawing Sheets

(56) References Cited

U.S. PATENT DOCUMENTS

| | | |
|---|---|---|
| 4,200,291 A | 4/1980 | Hooker |
| 4,335,809 A | 6/1982 | Wain |
| 4,339,798 A | 7/1982 | Hedges et al. |
| 4,344,345 A | 8/1982 | Sano |
| 4,363,482 A | 12/1982 | Goldfarb |
| 4,389,048 A | 6/1983 | Burgess |
| RE31,441 E | 11/1983 | Nutting et al. |
| 4,494,197 A | 1/1985 | Troy et al. |
| 4,496,149 A | 1/1985 | Schwartzberg |
| 4,506,890 A | 3/1985 | Murry |
| 4,517,656 A | 5/1985 | Solimeno et al. |
| 4,570,934 A | 2/1986 | Smyth |
| 4,618,150 A | 10/1986 | Kimura |
| 4,621,814 A | 11/1986 | Stepan et al. |
| 4,648,600 A | 3/1987 | Olliges |
| 4,695,053 A | 9/1987 | Vazquez, Jr. et al. |
| 4,732,386 A | 3/1988 | Rayfiel |
| 4,836,546 A | 6/1989 | Dire et al. |
| 4,837,728 A | 6/1989 | Barrie et al. |
| 4,838,552 A | 6/1989 | Hagiwara |
| 4,856,787 A | 8/1989 | Itkis |
| 4,874,173 A | 10/1989 | Kishishita |
| 4,961,575 A | 10/1990 | Perry |
| 5,031,914 A | 7/1991 | Rosenthal |
| 5,043,889 A | 8/1991 | Lucey et al. |
| 5,046,735 A | 9/1991 | Hamano et al. |
| 5,067,712 A | 11/1991 | Georgilas |
| 5,096,195 A | 3/1992 | Gimmon |
| 5,152,529 A | 10/1992 | Okada |
| 5,179,517 A | 1/1993 | Sarbin et al. |
| 5,205,555 A | 4/1993 | Hamano |
| 5,242,163 A | 9/1993 | Fulton |
| 5,259,616 A | 11/1993 | Bergmann |
| 5,265,877 A | 11/1993 | Boylan |
| 5,275,400 A | 1/1994 | Weingardt et al. |
| 5,342,047 A | 8/1994 | Heidel et al. |
| 5,342,049 A | 8/1994 | Wichinsky et al. |
| 5,344,145 A | 9/1994 | Chadwick et al. |
| 5,356,140 A | 10/1994 | Dabrowski et al. |
| 5,390,938 A | 2/1995 | Takeya |
| 5,393,057 A | 2/1995 | Marnell, II |
| 5,393,061 A | 2/1995 | Manship et al. |
| 5,395,111 A | 3/1995 | Inoue |
| 5,397,125 A | 3/1995 | Adams |
| 5,449,173 A | 9/1995 | Thomas et al. |
| 5,569,084 A | 10/1996 | Nicastro et al. |
| 5,580,053 A | 12/1996 | Crouch |
| 5,584,764 A | 12/1996 | Inoue |
| 5,609,524 A | 3/1997 | Inoue |
| 5,611,535 A | 3/1997 | Tiberio |
| 5,669,817 A | 9/1997 | Tarantino |
| 5,687,968 A | 11/1997 | Tarantino |
| 5,697,843 A | 12/1997 | Manship et al. |
| 5,704,835 A | 1/1998 | Dietz, II |
| 5,707,286 A | 1/1998 | Carlson |
| 5,722,891 A | 3/1998 | Inoue |
| 5,741,183 A | 4/1998 | Acres et al. |
| 5,762,552 A | 6/1998 | Vuong et al. |
| 5,766,074 A | 6/1998 | Cannon et al. |
| 5,769,716 A | 6/1998 | Saffari et al. |
| 5,772,509 A | 6/1998 | Weiss |
| 5,775,692 A | 7/1998 | Watts et al. |
| 5,788,240 A | 8/1998 | Feinberg |
| 5,788,573 A | 8/1998 | Baerlocher et al. |
| 5,807,172 A | 9/1998 | Piechowiak |
| 5,820,459 A | 10/1998 | Acres et al. |
| 5,823,873 A | 10/1998 | Moody |
| 5,823,874 A | 10/1998 | Adams |
| 5,833,538 A | 11/1998 | Weiss |
| 5,836,817 A | 11/1998 | Acres et al. |
| 5,848,932 A | 12/1998 | Adams |
| 5,876,284 A | 3/1999 | Acres et al. |
| 5,890,962 A | 4/1999 | Takemoto |
| 5,902,184 A | 5/1999 | Bennett et al. |
| 5,910,048 A | 6/1999 | Feinberg |
| 5,911,418 A | 6/1999 | Adams |
| 5,947,820 A | 9/1999 | Morro et al. |
| 5,951,397 A | 9/1999 | Dickinson |
| 5,964,463 A | 10/1999 | Moore, Jr. |
| 5,967,894 A | 10/1999 | Kinoshita et al. |
| 5,976,016 A | 11/1999 | Moody et al. |
| 5,980,384 A | 11/1999 | Barrie |
| 5,984,779 A | 11/1999 | Bridgeman et al. |
| 5,984,782 A | 11/1999 | Inoue |
| 5,997,400 A | 12/1999 | Seelig et al. |
| 5,997,401 A | 12/1999 | Crawford |
| 6,015,346 A | 1/2000 | Bennett |
| 6,033,307 A | 3/2000 | Vancura |
| 6,056,642 A | 5/2000 | Bennett |
| 6,059,289 A | 5/2000 | Vancura |
| 6,059,658 A | 5/2000 | Mangano et al. |
| 6,062,979 A | 5/2000 | Inoue |
| 6,071,192 A | 6/2000 | Weiss |
| 6,089,976 A | 7/2000 | Schneider et al. |
| 6,089,977 A | 7/2000 | Bennett |
| 6,089,978 A | 7/2000 | Adams |
| 6,093,102 A | 7/2000 | Bennett |
| 6,102,400 A | 8/2000 | Scott et al. |
| 6,102,798 A | 8/2000 | Bennett |
| 6,106,393 A | 8/2000 | Sunaga et al. |
| 6,110,041 A | 8/2000 | Walker et al. |
| 6,110,043 A | 8/2000 | Olsen |
| 6,113,495 A | 9/2000 | Walker et al. |
| 6,120,031 A | 9/2000 | Adams |
| 6,120,377 A | 9/2000 | Mcginnis, Sr. et al. |
| 6,120,378 A | 9/2000 | Moody et al. |
| 6,123,333 A | 9/2000 | Mcginnis, Sr. et al. |
| 6,142,875 A | 11/2000 | Kodachi et al. |
| 6,146,273 A | 11/2000 | Olsen |
| 6,155,925 A | 12/2000 | Giobbi et al. |
| 6,159,096 A | 12/2000 | Yoseloff |
| 6,159,097 A | 12/2000 | Gura |
| 6,159,098 A | 12/2000 | Slomiany et al. |
| 6,162,122 A | 12/2000 | Acres et al. |
| 6,173,955 B1 | 1/2001 | Perrie et al. |
| 6,174,233 B1 | 1/2001 | Sunaga et al. |
| 6,174,235 B1 | 1/2001 | Walker et al. |
| 6,176,487 B1 | 1/2001 | Eklund et al. |
| 6,186,894 B1 | 2/2001 | Mayeroff |
| 6,190,255 B1 | 2/2001 | Thomas et al. |
| 6,203,429 B1 | 3/2001 | Demar et al. |
| 6,210,277 B1 | 4/2001 | Stefan |
| 6,210,279 B1 | 4/2001 | Dickinson |
| 6,213,876 B1 | 4/2001 | Moore, Jr. |
| 6,217,448 B1 | 4/2001 | Olsen |
| 6,227,971 B1 | 5/2001 | Weiss |
| 6,251,013 B1 | 6/2001 | Bennett |
| 6,254,481 B1 | 7/2001 | Jaffe |
| 6,257,981 B1 | 7/2001 | Acres et al. |
| 6,261,178 B1 | 7/2001 | Bennett |
| 6,270,411 B1 | 8/2001 | Gura et al. |
| 6,270,412 B1 | 8/2001 | Crawford et al. |
| 6,290,600 B1 | 9/2001 | Glasson |
| 6,306,034 B1 | 10/2001 | Sakamoto et al. |
| 6,309,299 B1 | 10/2001 | Weiss |
| 6,312,334 B1 | 11/2001 | Yoseloff |
| 6,315,666 B1 | 11/2001 | Mastera et al. |
| 6,319,124 B1 | 11/2001 | Baerlocher et al. |
| 6,319,125 B1 | 11/2001 | Acres |
| 6,321,323 B1 | 11/2001 | Nugroho et al. |
| 6,322,078 B1 | 11/2001 | Adams |
| 6,331,143 B1 | 12/2001 | Yoseloff |
| 6,334,814 B1 | 1/2002 | Adams |
| 6,336,860 B1 | 1/2002 | Webb |
| 6,346,043 B1 | 2/2002 | Colin et al. |
| 6,364,767 B1 | 4/2002 | Brossard et al. |
| 6,364,768 B1 | 4/2002 | Acres et al. |
| 6,375,568 B1 | 4/2002 | Roffman et al. |
| 6,375,569 B1 | 4/2002 | Acres |
| 6,375,570 B1 | 4/2002 | Poole |
| 6,394,902 B1 | 5/2002 | Glavich et al. |
| 6,409,596 B1 | 6/2002 | Hayashida et al. |
| 6,413,162 B1 | 7/2002 | Baerlocher et al. |
| 6,419,579 B1 | 7/2002 | Bennett |

(56) References Cited

U.S. PATENT DOCUMENTS

| | | |
|---|---|---|
| 6,443,837 B1 | 9/2002 | Jaffe et al. |
| 6,450,883 B1 | 9/2002 | O'halloran |
| RE37,885 E | 10/2002 | Acres et al. |
| 6,491,584 B2 | 12/2002 | Graham et al. |
| 6,494,454 B2 | 12/2002 | Adams |
| 6,494,785 B1 | 12/2002 | Gerrard et al. |
| 6,517,432 B1 | 2/2003 | Jaffe |
| 6,520,855 B2 | 2/2003 | DeMar et al. |
| 6,533,658 B1 | 3/2003 | Walker et al. |
| 6,533,660 B2 | 3/2003 | Seelig et al. |
| 6,537,152 B2 | 3/2003 | Seelig et al. |
| 6,551,187 B1 | 4/2003 | Jaffe |
| 6,565,434 B1 | 5/2003 | Acres |
| 6,565,436 B1 | 5/2003 | Baerlocher |
| 6,581,935 B1 | 6/2003 | Odom |
| 6,585,591 B1 | 7/2003 | Baerlocher et al. |
| 6,592,457 B1 | 7/2003 | Frohm et al. |
| 6,599,192 B1 | 7/2003 | Baerlocher et al. |
| 6,602,136 B1 | 8/2003 | Baerlocher et al. |
| 6,604,740 B1 | 8/2003 | Singer et al. |
| 6,604,999 B2 | 8/2003 | Ainsworth |
| 6,605,001 B1 | 8/2003 | Tarantino |
| 6,616,142 B2 | 9/2003 | Adams |
| 6,632,139 B1 | 10/2003 | Baerlocher |
| 6,632,140 B2 | 10/2003 | Berman et al. |
| 6,634,943 B1 | 10/2003 | Baerlocher |
| 6,634,945 B2 | 10/2003 | Glavich et al. |
| 6,652,378 B2 | 11/2003 | Cannon et al. |
| 6,656,046 B1 | 12/2003 | Yoseloff et al. |
| 6,669,559 B1 | 12/2003 | Baerlocher et al. |
| 6,682,073 B2 | 1/2004 | Bryant et al. |
| 6,702,675 B2 | 3/2004 | Poole et al. |
| 6,726,565 B2 | 4/2004 | Hughs-Baird |
| 6,731,313 B1 | 5/2004 | Kaminkow |
| 6,739,971 B2 | 5/2004 | Devaull |
| 6,739,973 B1 | 5/2004 | Lucchesi et al. |
| 6,749,502 B2 | 6/2004 | Baerlocher |
| 6,755,738 B2 | 6/2004 | Glasson et al. |
| 6,769,985 B1 | 8/2004 | Laakso et al. |
| 6,780,109 B2 | 8/2004 | Kaminkow |
| 6,793,578 B2 | 9/2004 | Luccesi et al. |
| 6,802,775 B2 | 10/2004 | Baerlocher et al. |
| 6,805,349 B2 | 10/2004 | Baerlocher et al. |
| 6,832,957 B2 | 12/2004 | Falconer |
| 6,835,132 B2 | 12/2004 | Bennett |
| 6,837,788 B2 | 1/2005 | Cannon |
| 6,852,030 B2 | 2/2005 | Baerlocher et al. |
| 6,855,053 B2 | 2/2005 | Baerlocher |
| 6,855,054 B2 | 2/2005 | White et al. |
| 6,860,810 B2 | 3/2005 | Cannon et al. |
| 6,866,583 B2 | 3/2005 | Glavich et al. |
| 6,878,061 B2 | 4/2005 | Baerlocher et al. |
| 6,905,406 B2 | 6/2005 | Kaminkow et al. |
| 6,910,962 B2 | 6/2005 | Marks et al. |
| 6,913,532 B2 | 7/2005 | Baerlocher et al. |
| 6,921,335 B2 | 7/2005 | Rodgers et al. |
| 6,929,952 B2 | 8/2005 | Baerlocher |
| 6,935,955 B1 | 8/2005 | Kaminkow et al. |
| 6,939,224 B2 | 9/2005 | Palmer et al. |
| 6,939,226 B1 | 9/2005 | Joshi |
| 6,958,013 B2 | 10/2005 | Miereau et al. |
| 6,960,133 B1 | 11/2005 | Marks et al. |
| 6,960,134 B2 | 11/2005 | Hartl et al. |
| 6,986,710 B2 | 1/2006 | Baerlocher et al. |
| 6,997,802 B2 | 2/2006 | Gauselmann |
| 6,997,804 B2 | 2/2006 | Berman |
| 6,997,808 B2 | 2/2006 | Rodgers et al. |
| 7,001,274 B2 | 2/2006 | Baerlocher et al. |
| 7,014,560 B2 | 3/2006 | Glavich et al. |
| 7,029,395 B1 | 4/2006 | Baerlocher |
| 7,040,983 B2 | 5/2006 | Dolloff et al. |
| 7,040,985 B2 | 5/2006 | Vancura |
| 7,040,987 B2 | 5/2006 | Walker et al. |
| 7,052,395 B2 | 5/2006 | Glavich et al. |
| 7,056,209 B2 | 6/2006 | Baerlocher et al. |
| 7,056,213 B2 | 6/2006 | Ching et al. |
| 7,059,967 B2 | 6/2006 | Baerlocher |
| 7,070,502 B1 | 7/2006 | Bussick et al. |
| 7,074,127 B2 | 7/2006 | Cuddy et al. |
| 7,090,579 B2 | 8/2006 | Tarantino |
| 7,090,580 B2 | 8/2006 | Rodgers et al. |
| 7,104,886 B2 | 9/2006 | Baerlocher et al. |
| 7,121,942 B2 | 10/2006 | Baerlocher |
| 7,153,205 B2 | 12/2006 | Baerlocher |
| 7,252,590 B2 | 8/2007 | Palmer et al. |
| 7,316,613 B2 | 1/2008 | Luccesi et al. |
| 7,329,179 B2 | 2/2008 | Baerlocher |
| 7,351,146 B2 | 4/2008 | Kaminkow |
| 7,371,169 B2 | 5/2008 | Baerlocher |
| 7,371,170 B2 | 5/2008 | Cregan et al. |
| 7,381,134 B2 | 6/2008 | Cuddy et al. |
| 7,384,334 B2 | 6/2008 | Glavich et al. |
| 7,387,570 B2 | 6/2008 | Randall |
| 7,399,228 B2 | 7/2008 | Baerlocher |
| 7,402,103 B2 | 7/2008 | Baerlocher |
| 7,452,270 B2 | 11/2008 | Walker et al. |
| 7,465,227 B2 | 12/2008 | Baerlocher |
| 7,470,185 B2 | 12/2008 | Baerlocher |
| 7,488,251 B2 | 2/2009 | Kaminkow |
| 7,513,828 B2 | 4/2009 | Nguyen et al. |
| 7,591,726 B2 | 9/2009 | Baerlocher et al. |
| 7,594,851 B2 | 9/2009 | Falconer |
| 7,666,086 B2 | 2/2010 | Baerlocher |
| 7,666,087 B2 | 2/2010 | Hughs-Baird |
| 7,699,698 B2 | 4/2010 | Randall |
| 7,758,416 B2 | 7/2010 | Randall |
| 7,789,743 B2 | 9/2010 | Walker et al. |
| 7,819,744 B2 | 10/2010 | Hughs-Baird |
| 7,828,643 B2 | 11/2010 | Baerlocher |
| 7,833,101 B2 | 11/2010 | Lutnick et al. |
| 7,837,547 B2 | 11/2010 | Cannon |
| 7,846,018 B2 | 12/2010 | Baerlocher |
| 7,850,522 B2 | 12/2010 | Walker et al. |
| 7,867,077 B2 | 1/2011 | Baerlocher et al. |
| 7,905,771 B2 | 3/2011 | Walker et al. |
| 7,905,774 B2 | 3/2011 | Walker et al. |
| 7,914,372 B2 | 3/2011 | Tessmer et al. |
| 7,931,531 B2 | 4/2011 | Oberberger |
| 7,950,993 B2 | 5/2011 | Oberberger |
| 7,967,674 B2 | 6/2011 | Baerlocher |
| 7,976,378 B2 | 7/2011 | Baerlocher |
| 8,016,657 B2 | 9/2011 | Walker et al. |
| 8,020,866 B2 | 9/2011 | Walker et al. |
| 8,066,564 B2 | 11/2011 | Randall |
| 8,087,999 B2 | 1/2012 | Oberberger et al. |
| 8,157,633 B2 | 4/2012 | Kaminkow |
| 8,197,335 B2 | 6/2012 | DeWaal et al. |
| 8,235,802 B2 | 8/2012 | Sugiyama et al. |
| 2002/0077165 A1 | 6/2002 | Bansemer et al. |
| 2002/0077167 A1* | 6/2002 | Merari .......................... 463/13 |
| 2002/0177483 A1* | 11/2002 | Cannon .......................... 463/42 |
| 2002/0183105 A1* | 12/2002 | Cannon ................ G07F 17/32 463/16 |
| 2003/0027619 A1 | 2/2003 | Nicastro |
| 2003/0064771 A1 | 4/2003 | Morrow et al. |
| 2003/0064807 A1 | 4/2003 | Walker et al. |
| 2003/0100357 A1* | 5/2003 | Walker ................ G07F 17/32 463/16 |
| 2003/0157981 A1 | 8/2003 | Marks et al. |
| 2003/0203753 A1 | 10/2003 | Muir et al. |
| 2003/0224850 A1 | 12/2003 | Anderson et al. |
| 2004/0023714 A1 | 2/2004 | Van Asdale |
| 2004/0033829 A1 | 2/2004 | Pacey et al. |
| 2004/0048646 A1 | 3/2004 | Visocnik |
| 2004/0048657 A1 | 3/2004 | Gauselmann |
| 2004/0053661 A1 | 3/2004 | Jones et al. |
| 2004/0053669 A1 | 3/2004 | Gerrard et al. |
| 2004/0053670 A1 | 3/2004 | Rothkranz et al. |
| 2004/0053676 A1 | 3/2004 | Rodgers |
| 2004/0053677 A1 | 3/2004 | Hughs-Baird |
| 2004/0053695 A1 | 3/2004 | Mattice et al. |
| 2004/0063489 A1 | 4/2004 | Crumby |
| 2004/0067790 A1 | 4/2004 | Peterson et al. |
| 2004/0077396 A1 | 4/2004 | Poole et al. |

(56) References Cited

U.S. PATENT DOCUMENTS

| | | |
|---|---|---|
| 2004/0082373 A1 | 4/2004 | Cole et al. |
| 2004/0087357 A1* | 5/2004 | Johnson ............... G07F 17/32 463/17 |
| 2004/0097282 A1 | 5/2004 | Baerlocher et al. |
| 2004/0116175 A1 | 6/2004 | Aida |
| 2004/0142739 A1 | 7/2004 | Loose et al. |
| 2004/0198489 A1 | 10/2004 | Kaminkow et al. |
| 2004/0209685 A1 | 10/2004 | Lucchesi et al. |
| 2004/0219969 A1 | 11/2004 | Casey et al. |
| 2004/0259625 A1 | 12/2004 | Randall et al. |
| 2004/0266520 A1 | 12/2004 | Aida |
| 2005/0020344 A1 | 1/2005 | Kaminkow |
| 2005/0049035 A1 | 3/2005 | Baerlocher et al. |
| 2005/0049036 A1 | 3/2005 | Mead |
| 2005/0054415 A1 | 3/2005 | Kaminkow et al. |
| 2005/0054421 A1 | 3/2005 | Hughs-Baird et al. |
| 2005/0054434 A1 | 3/2005 | Baerlocher et al. |
| 2005/0064924 A1 | 3/2005 | Glavich et al. |
| 2005/0064926 A1 | 3/2005 | Walker et al. |
| 2005/0064935 A1 | 3/2005 | Blanco |
| 2005/0070354 A1 | 3/2005 | Baerlocher et al. |
| 2005/0101380 A1 | 5/2005 | Glavich et al. |
| 2005/0107154 A1 | 5/2005 | Pacey |
| 2005/0130729 A1 | 6/2005 | Baerlocher et al. |
| 2005/0130731 A1 | 6/2005 | Englman et al. |
| 2005/0130737 A1 | 6/2005 | Englman et al. |
| 2005/0143165 A1 | 6/2005 | Berman et al. |
| 2005/0148381 A1 | 7/2005 | Marks et al. |
| 2005/0148384 A1 | 7/2005 | Marks et al. |
| 2005/0176494 A1 | 8/2005 | Thomas |
| 2005/0215311 A1 | 9/2005 | Hornik et al. |
| 2005/0227754 A1 | 10/2005 | Kaminkow et al. |
| 2005/0282615 A1 | 12/2005 | Englman et al. |
| 2005/0282620 A1 | 12/2005 | Marks et al. |
| 2005/0282625 A1 | 12/2005 | Nicely |
| 2005/0288094 A1 | 12/2005 | Marks et al. |
| 2006/0009277 A1 | 1/2006 | Hartl et al. |
| 2006/0030392 A1 | 2/2006 | Rodgers et al. |
| 2006/0030396 A1 | 2/2006 | Marks et al. |
| 2006/0030399 A1 | 2/2006 | Baerlocher |
| 2006/0030401 A1 | 2/2006 | Mead et al. |
| 2006/0063584 A1 | 3/2006 | Brill et al. |
| 2006/0068875 A1 | 3/2006 | Cregan et al. |
| 2006/0068882 A1 | 3/2006 | Baerlocher et al. |
| 2006/0068883 A1 | 3/2006 | Randall et al. |
| 2006/0073876 A1 | 4/2006 | Cuddy |
| 2006/0084493 A1 | 4/2006 | Pederson et al. |
| 2006/0084494 A1 | 4/2006 | Belger et al. |
| 2006/0084496 A1 | 4/2006 | Jaffe et al. |
| 2006/0089191 A1 | 4/2006 | Singer et al. |
| 2006/0111174 A1 | 5/2006 | Baerlocher et al. |
| 2006/0116195 A1 | 6/2006 | Baerlocher et al. |
| 2006/0135247 A1 | 6/2006 | Baerlocher et al. |
| 2006/0142077 A1 | 6/2006 | Miles et al. |
| 2006/0149561 A1* | 7/2006 | Govender ............... 705/1 |
| 2006/0199636 A1 | 9/2006 | Ching et al. |
| 2006/0199637 A1 | 9/2006 | Ching et al. |
| 2006/0247029 A1 | 11/2006 | Walker et al. |
| 2006/0252492 A1 | 11/2006 | Anderson et al. |
| 2007/0060252 A1 | 3/2007 | Taylor |
| 2007/0060294 A1 | 3/2007 | Cuddy et al. |
| 2007/0060300 A1 | 3/2007 | Baerlocher |
| 2007/0087809 A1 | 4/2007 | Baerlocher |
| 2007/0270204 A1 | 11/2007 | Palmer et al. |
| 2008/0064480 A1 | 3/2008 | Randall |
| 2008/0076501 A1 | 3/2008 | Mares et al. |
| 2008/0102916 A1 | 5/2008 | Kovacs et al. |
| 2008/0102934 A1 | 5/2008 | Tan |
| 2008/0113759 A1 | 5/2008 | Baerlocher |
| 2008/0124396 A1 | 5/2008 | Schwarz et al. |
| 2008/0132320 A1 | 6/2008 | Rodgers |
| 2008/0139296 A1 | 6/2008 | Baerlocher et al. |
| 2008/0153564 A1 | 6/2008 | Baerlocher et al. |
| 2008/0182650 A1 | 7/2008 | Randall et al. |
| 2008/0182655 A1 | 7/2008 | DeWaal et al. |
| 2008/0200237 A1 | 8/2008 | Cuddy et al. |
| 2008/0248865 A1 | 10/2008 | Tedesco et al. |
| 2008/0318668 A1 | 12/2008 | Ching et al. |
| 2009/0042652 A1 | 2/2009 | Baerlocher et al. |
| 2009/0069073 A1 | 3/2009 | Gerrard et al. |
| 2009/0098933 A1 | 4/2009 | Walker et al. |
| 2009/0111573 A1 | 4/2009 | Iddings |
| 2009/0117979 A1 | 5/2009 | Decasa, Jr. et al. |
| 2009/0143133 A1 | 6/2009 | Baerlocher |
| 2010/0120506 A1 | 5/2010 | Davis et al. |
| 2010/0124969 A1 | 5/2010 | Hughes et al. |
| 2010/0148442 A1 | 6/2010 | Walker et al. |
| 2010/0234086 A1 | 9/2010 | Michaelson |
| 2010/0261518 A1 | 10/2010 | Randall |
| 2010/0267441 A1 | 10/2010 | Baerlocher |
| 2011/0070946 A1 | 3/2011 | Baerlocher et al. |
| 2011/0111820 A1 | 5/2011 | Filipour et al. |
| 2011/0111824 A1 | 5/2011 | Cuddy et al. |
| 2011/0111841 A1 | 5/2011 | Tessmer et al. |
| 2011/0117999 A1 | 5/2011 | Anderson et al. |
| 2011/0124396 A1 | 5/2011 | Walker et al. |
| 2011/0124402 A1 | 5/2011 | DeWaal et al. |
| 2011/0201413 A1 | 8/2011 | Oberberger |
| 2011/0218024 A1 | 9/2011 | Baerlocher |
| 2012/0040739 A1 | 2/2012 | Randall |
| 2012/0184356 A1 | 7/2012 | Kaminkow |
| 2012/0184357 A1 | 7/2012 | Kaminkow |

FOREIGN PATENT DOCUMENTS

| | | |
|---|---|---|
| EP | 1 079 345 | 2/2001 |
| GB | 1 242 298 | 8/1971 |
| GB | 2 062 923 | 5/1981 |
| GB | 2 066 991 | 7/1981 |
| GB | 2 072 395 | 9/1981 |
| GB | 2 096 376 | 10/1982 |
| GB | 2 137 392 | 10/1984 |
| GB | 2 253 299 | 9/1992 |
| GB | 2 372 617 | 8/2002 |
| WO | WO 97/32285 | 9/1997 |
| WO | WO 00/12186 | 3/2000 |
| WO | WO 02/18025 | 3/2002 |
| WO | WO 2004/026417 | 4/2004 |
| WO | WO 2005/058444 | 6/2005 |
| WO | WO 2005/079936 | 9/2005 |

OTHER PUBLICATIONS

Description of Angel or Devil Game, printed from Vegas.williamhill.com+screenshots of Angel or Devil Slider, printed on Sep. 24, 2012.

* cited by examiner

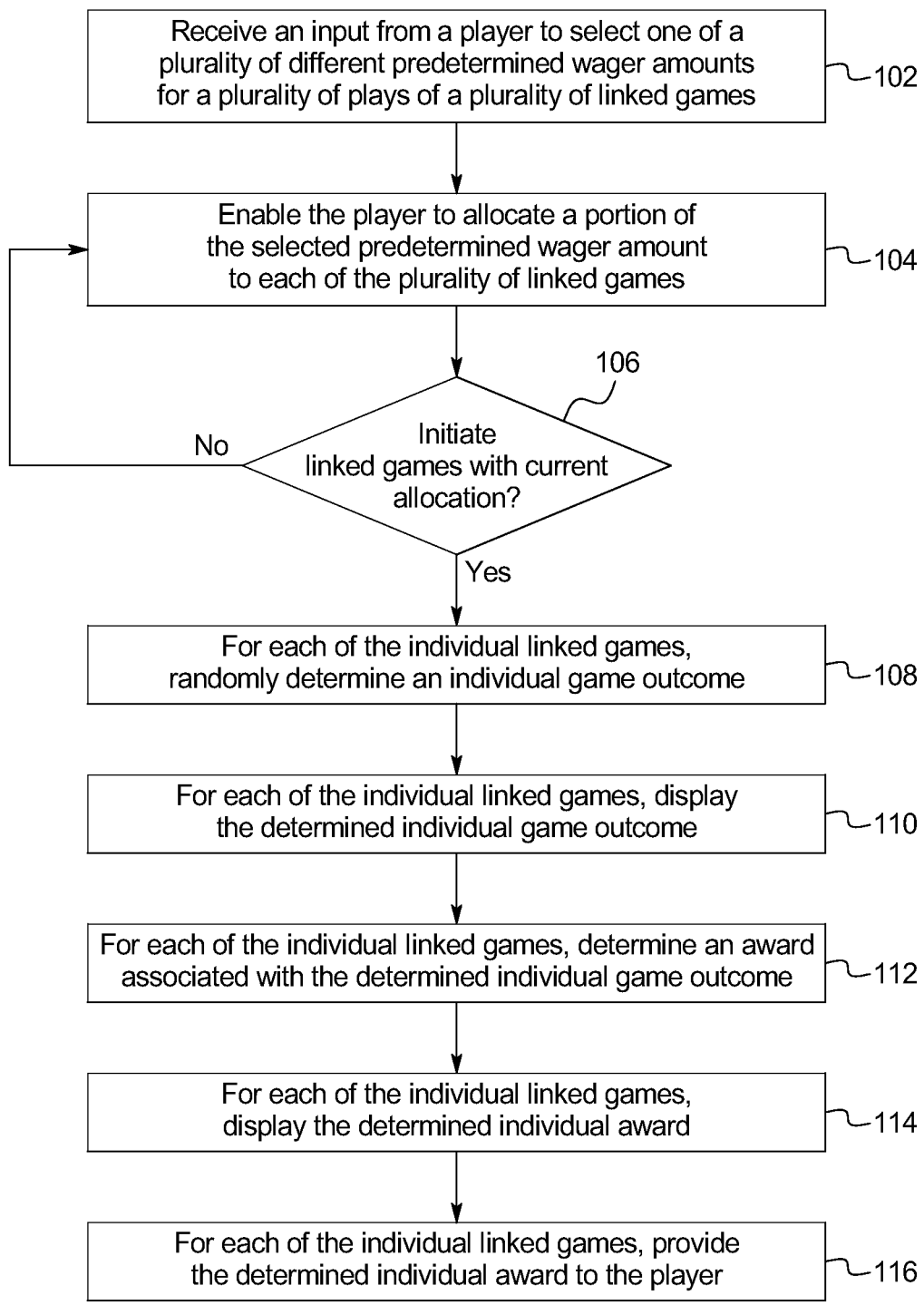

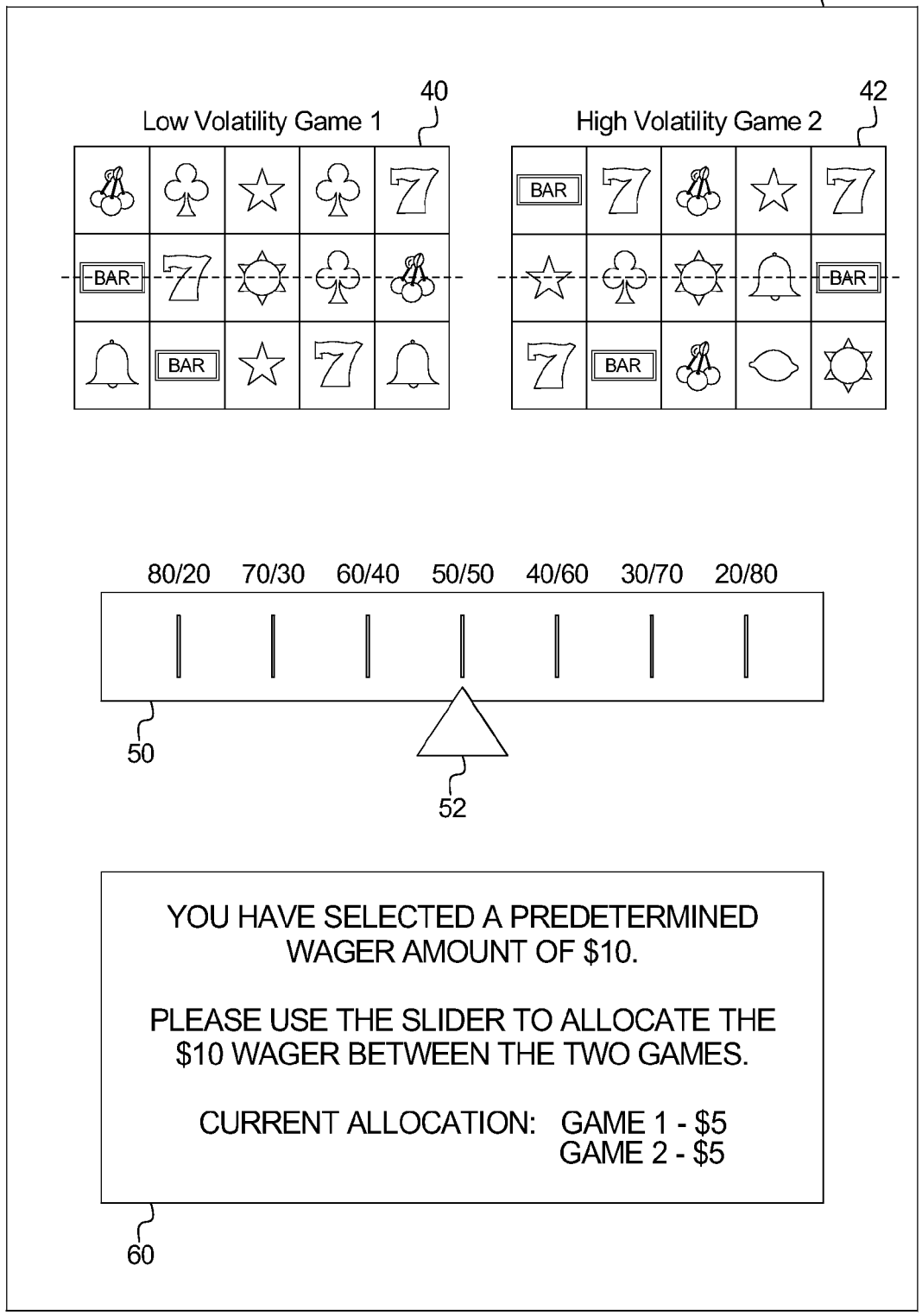

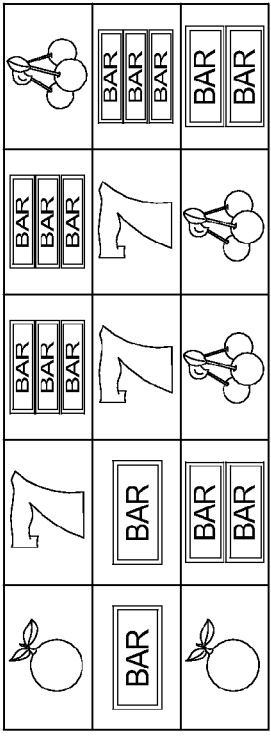
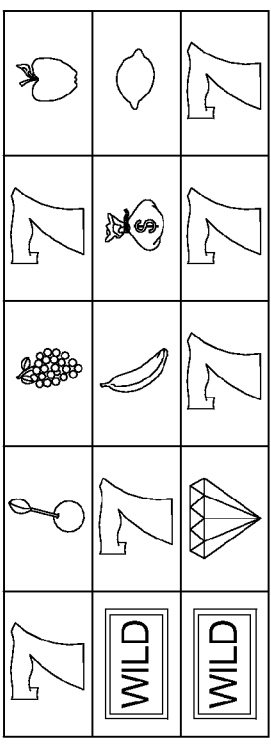
FIG. 3B

FIG. 3C

GAMING SYSTEM AND METHOD FOR PROVIDING PLAYS OF MULTIPLE GAMES

BACKGROUND

Gaming systems which provide players awards in primary or base games are well known. Gaming systems generally require the player to place or make a wager to activate a primary or base game. Certain known gaming systems enable a player to wager on and play a plurality of primary or base games simultaneously. In many of these gaming systems, the award for each played primary game is based on the player obtaining a winning symbol or symbol combination and on the amount of the wager placed on that primary game (e.g., the higher the wager, the higher the award). Generally, symbols or symbol combinations which are less likely to occur usually provide higher awards.

Various known gaming systems enable players to place multiple wagers on multiple games and simultaneously display multiple plays of these multiple games. Particularly, the player places a wager amount on each of the multiple games and, for each individual game played, the gaming system determines any awards based on the generated symbol combinations and the wager amount placed for that game.

There is a continuing need to provide new and different gaming systems and methods which incorporate new and different ways to play multiple games.

SUMMARY

The present disclosure relates generally to gaming systems and methods for enabling a player to allocate a wager amount amongst a plurality of linked games.

In various embodiments, the gaming system and method disclosed herein provides a plurality of linked games and enables a player to allocate portions of a selected predetermined wager amount amongst the plurality of linked games. Particularly, the gaming system enables a player to select a single one of a plurality of different predetermined wager levels for the plurality of games played. Each different predetermined wager level has a corresponding different wager amount. In one embodiment, each of the different wager amounts singularly selected for the play of a plurality of games is less than a sum total of a maximum wager amount associated with each of the plays of each of the plurality of linked games. For example, for the play of two games wherein each play of each game has a maximum wager amount of $5, the gaming system enables the player to select a single wager level associated with the collective wager amounts of $3, $4, $5, $6, $7, and $8. In this example, the collective wager amounts of $3, $4, $5, $6, $7, and $8 for the different wager levels available for the play of these two collective games are each less than $10 (i.e., the sum total of the maximum wager amount of $5 for each of the two games).

After the player selects a wager level, the gaming system enables the player to allocate portions of the wager amount of the selected wager level amongst the plurality of linked games. In various embodiments, the linked games are simultaneously, concurrently, or overlappingly played. In other embodiments, the linked games are sequentially played. Continuing with the above example, after selecting a wager level having an associated collective wager amount of $3 (i.e., after selecting a single wager level having a single wager amount of $3 for the collective play of two separate games), the player allocates $1 of the wager amount to a first linked game and the remaining $2 of the wager amount to a second linked game. In one such embodiment, the player allocates the wager amount of the selected wager level by assigning a portion of the wager amount to each of the plurality of linked games (such as by manipulating a wager allocation modifier or slider to manipulate the allocation of the wager) wherein the total of the assigned portions equals the wager amount for the selected wager level. Such a configuration provides a single input that enables a player to place multiple wagers on multiple linked games. Such a configuration further increases the excitement and enjoyment for certain players by invoking an aspect of strategy in allocating the player's wager amount for the player's wager level amongst different games having different attributes.

In one embodiment, when the player modifies (e.g., increases or decreases) the portion of the wager amount allocated for one linked game, the gaming system automatically modifies (e.g., decreases or increases) the portion of the wager amount allocated for at least one of the remaining linked games. That is, the gaming system ensures that for any changes in the player's allocation for any individual game, the same total wager amount is placed across all of the linked games. Accordingly, a single input by the player causes the gaming system to modify multiple wagers (i.e., multiple modifications) placed on multiple linked games.

Following the allocation of the wager amount of the selected predetermined wager level, for each of the linked games, the gaming system displays an outcome in the provided play of that game, and determines any award based on the displayed outcome and the corresponding allocated portion of the wager amount on that game. The gaming system provides the determined award for each of the linked games to the player. Such a configuration of providing multiple linked games provides an increased level of excitement and enjoyment for players.

Additional features and advantages are described in, and will be apparent from, the following Detailed Description and the figures.

BRIEF DESCRIPTION OF THE FIGURES

FIG. 1 is a flow chart of an example process for operating a gaming system providing one embodiment of linked plays of multiple games as disclosed herein.

FIGS. 2A, 2B, and 2C are each front perspective views of displays provided by one embodiment of the gaming system disclosed herein illustrating linked plays of two different games.

FIGS. 3A, 3B, and 3C are each front perspective views of displays provided by one embodiment of the gaming system disclosed herein illustrating linked plays of two games utilizing different available symbols.

DETAILED DESCRIPTION

Figure 2B:
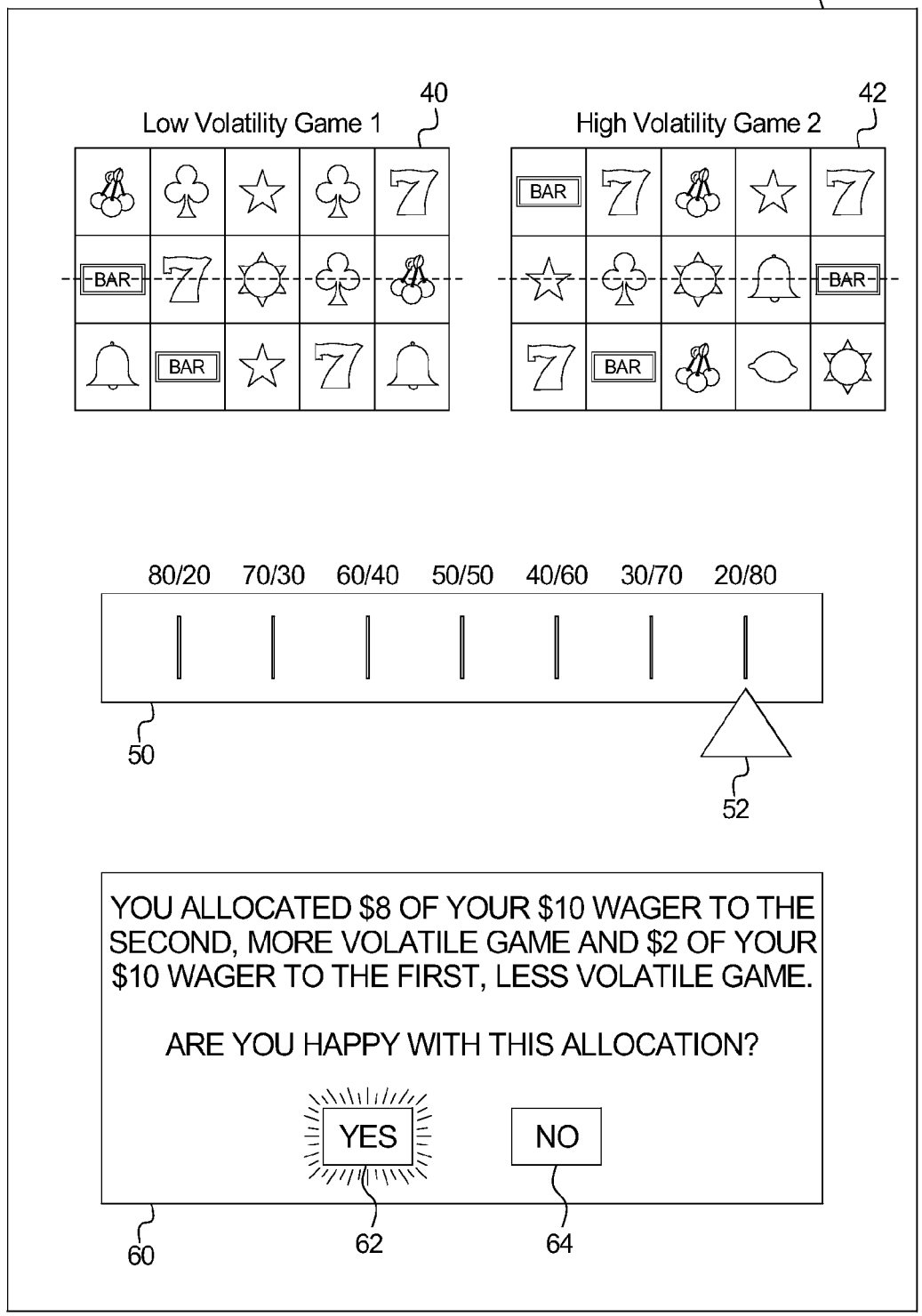

In various embodiments, the gaming system and method disclosed herein provides a plurality of linked games and enables a player to allocate portions of a selected predetermined wager amount amongst the plurality of linked games. Particularly, the gaming system enables a player to select a single one of a plurality of different predetermined wager levels for the linked games and enables the player to allocate portions of a wager amount of the selected wager level amongst the plurality of linked games. The sum total of the allocated portions equals the wager amount for the selected wager level.

While the player's credit balance, the player's wager, and any awards described below are displayed as an amount of monetary credits or currency in certain of the embodiments described below, one or more of such player's credit balance, such player's wager, and any awards provided to such a player may be for non-monetary credits, promotional credits, and/or player tracking points or credits.

Referring now to FIG. 1, a flowchart of an example process for operating a gaming system or a gaming device disclosed herein is illustrated. Particularly, the process relates to operating multiple linked games for multiple linked plays by a player of the gaming system. In one embodiment, this process is embodied in one or more software programs stored in one or more memories and executed by one or more processors or controllers. Although this process is described with reference to the flowchart illustrated in FIG. 1, it should be appreciated that many other methods of performing the acts associated with this process may be used. For example, the order of certain of the blocks described may be changed, or certain of the blocks described may be optional.

In operation of this embodiment, the gaming system displays a plurality of linked games. In various embodiments, the plurality of linked games include simultaneously, concurrently, or overlappingly played games. In other embodiments, the plurality of linked games include sequentially played games. In further embodiments, the plurality of linked games include at least two simultaneously, concurrently, or overlappingly played games, followed by at least two simultaneously, concurrently, or overlappingly played games (i.e., the gaming system includes sequential plays of simultaneously, concurrently, or overlappingly played games). In further embodiments, the plurality of linked games include at least two simultaneously, concurrently, or overlappingly played games, followed by a single game. In further embodiments, the plurality of linked games include a single game followed by at least two simultaneously, concurrently, or overlappingly played games.

As indicated in block 102 of FIG. 1, the gaming system receives an input from a player to select one of a plurality of different predetermined wager amounts for a plurality of linked plays of the plurality of linked games. After receiving the input, the gaming system enables the player to allocate a portion of the selected predetermined wager amount to each of the plurality of linked games as indicated in block 104. In one embodiment, the gaming system enables the player to modify one or more of the allocated portions while ensuring that the total of the allocated portions remains equal to the predetermined wager amount. For example, the gaming system enables the player to adjust a wager allocation modifier such as a wager allocation slider and, based on a position of the wager allocation slider, the gaming system allocates percentages of the predetermined wager amount across the plurality of linked games.

The gaming system determines whether to initiate the linked games with the current allocation as indicated in diamond 106. In one embodiment, the gaming system initiates the linked games in response to receiving an input, from the player, to initiate the games. In an alternative embodiment, the gaming system initiates the linked games in response to an expiration of a time period without any player input to modify the current allocation. If the gaming system determines to not initiate the linked games, the gaming system returns to 104 and further enables the player to allocate the portions of the selected predetermined wager amount. In these embodiments, if a player adjusts a wager amount on one of the linked games, the gaming system adjusts other wager amounts on the remaining linked games to maintain the selected predetermined wager level across the plurality of games. Such a gaming system prevents the player from inadvertently wagering a greater (or lesser) total for the play of the plurality of linked games than the player so desires.

If the gaming system determines to initiate the linked games, the gaming system randomly determines an individual game outcome for each of the individual linked games as indicated in block 108. It should be appreciated that the gaming system independently determines the individual game outcome for each of the individual linked games. The gaming system displays the determined individual game outcome for each of the individual linked games as indicated in block 110. The gaming system then determines an individual award associated with the determined individual game outcome for each of the individual linked games as indicated in block 112. The gaming system displays the determined individual award for each of the individual linked games as indicated in block 114. The gaming system then provides the determined individual award to the player for each of the individual linked games as indicated in block 116.

Referring to FIG. 2A, an example interface of a plurality of linked games is illustrated. The gaming system displays a first game 40 and a second game 42. In one embodiment as shown, the first game 40 is a relatively low volatility game and the second game 42 is a relatively high volatility game. Particularly, the second game 42 has potential award payouts that are greater than potential award payouts of the first game 40.

The gaming system enables the player to select one of a plurality of different predetermined wager amounts. For example, the player selects a wager amount of $10 and the gaming system displays, in an indicator 60, appropriate messages such as "YOU HAVE SELECTED A PREDETERMINED WAGER AMOUNT OF $10" to the player visually, or through suitable audio or audiovisual displays. In one embodiment, each of the plurality of different predetermined wager amounts are less than a sum total of a maximum wager amount associated with each of the first game 40 and the second game 42 and greater than a sum total of a minimum wager amount associated with each of the first game 40 and the second game 42. For example, if the minimum wager amount for each of the first game 40 and the second game 42 is $1 and the maximum wager amount for each of the first game 40 and the second game 42 is $10, the plurality of different predetermined wager amounts are all greater than $2 and less than $20.

As seen in FIG. 2A, the gaming system displays a wager allocation meter 50 and an accompanying wager modifier, such as a wager allocation slider 52. Particularly, the wager allocation meter 50 includes indications of various wager allocation distributions (e.g., 80%/20%, 70%/30%, etc.) between the first game 40 and the second game 42. The gaming system enables the player to adjust the wager allocation slider 52 to select one of the various wager allocation distributions. For example, if the player wagers $10 (i.e., the selected wager amount) on plays of the first game 40 and the second game 42 and if the player uses the wager allocation slider 52 to select the "40/60" allocation distribution, the gaming system allocates $4 to the first game 40 (i.e., 40% of the $10 wager) and $6 to the second game 42 (i.e., 60% of the $10 wager). In certain embodiments, the gaming system enables the player to modify or change the selected predetermined for subsequent plays of the linked games. It should be appreciated that while the illustrated example include predetermined wager allocations, in another embodiment, the gaming system enables the player to further refine or increment the wager allocation distribution, such as refining the wager allocation distribution between two linked games to one of 79%/21%, 78%/22% and 77%/23%.

In other embodiments, for subsequent plays of the linked games, the gaming system enables the player to select a repeat wager button wherein the player selects a previously-selected predetermined wager amount and previously-allocated portions of the previously-selected predetermined wager amount to apply to one or more subsequent games.

The gaming system further displays, in the indicator 60, appropriate messages such as "PLEASE USE THE SLIDER TO ALLOCATE THE $10 WAGER BETWEEN THE TWO GAMES" and "CURRENT ALLOCATION: GAME 1—$5, GAME 2—$5" to the player visually, or through suitable audio or audiovisual displays. In one embodiment, the gaming system determines and displays the "CURRENT ALLOCATION" message and information based on the position of the wager allocation slider 52. For example, as shown in FIG. 2A, because the wager allocation slider 52 is located at the "50/50" allocation distribution, the current allocations of the first game 40 and the second game 42 are both $5. The gaming system ensures that a sum total of the allocations equals the selected predetermined wager amount.

As shown in FIG. 2B, the player adjusts the wager allocation slider 52 to select the "20/80" allocation distribution. For this distribution, the gaming system allocates 20% of the selected predetermined wager amount to the first game 40 and 80% of the selected predetermined wager amount to the second game 42. In the embodiment as shown in FIG. 2B, for a selected predetermined wager amount of $10, the gaming system allocates $2 to the first game 40 and $8 to the second game 42. The gaming system displays, in the indicator 60, appropriate messages such as "YOU ALLOCATED $8 OF YOUR $10 WAGER TO THE SECOND, MORE VOLATILE GAME AND $2 OF YOUR $10 WAGER TO THE FIRST, LESS VOLATILE GAME" and "ARE YOU HAPPY WITH THIS ALLOCATION?" to the player visually, or through suitable audio or audiovisual displays. The gaming system further displays, in the indicator 60, an option to initiate the plays of the first game 40 and the second game 42 ("YES," 62) and an option to enable the player to further allocate the selected predetermined wager amount ("NO," 64). In an alternate embodiment, the gaming system dynamically and appropriately updates the allocation amounts in the messages displayed in the indicator 60 as the player adjusts the wager allocation slider 52. In one embodiment, if the player selects the "YES" option 62, the gaming system determines a game outcome for each of the first game 40 and the second game 42.

Figure 2C:
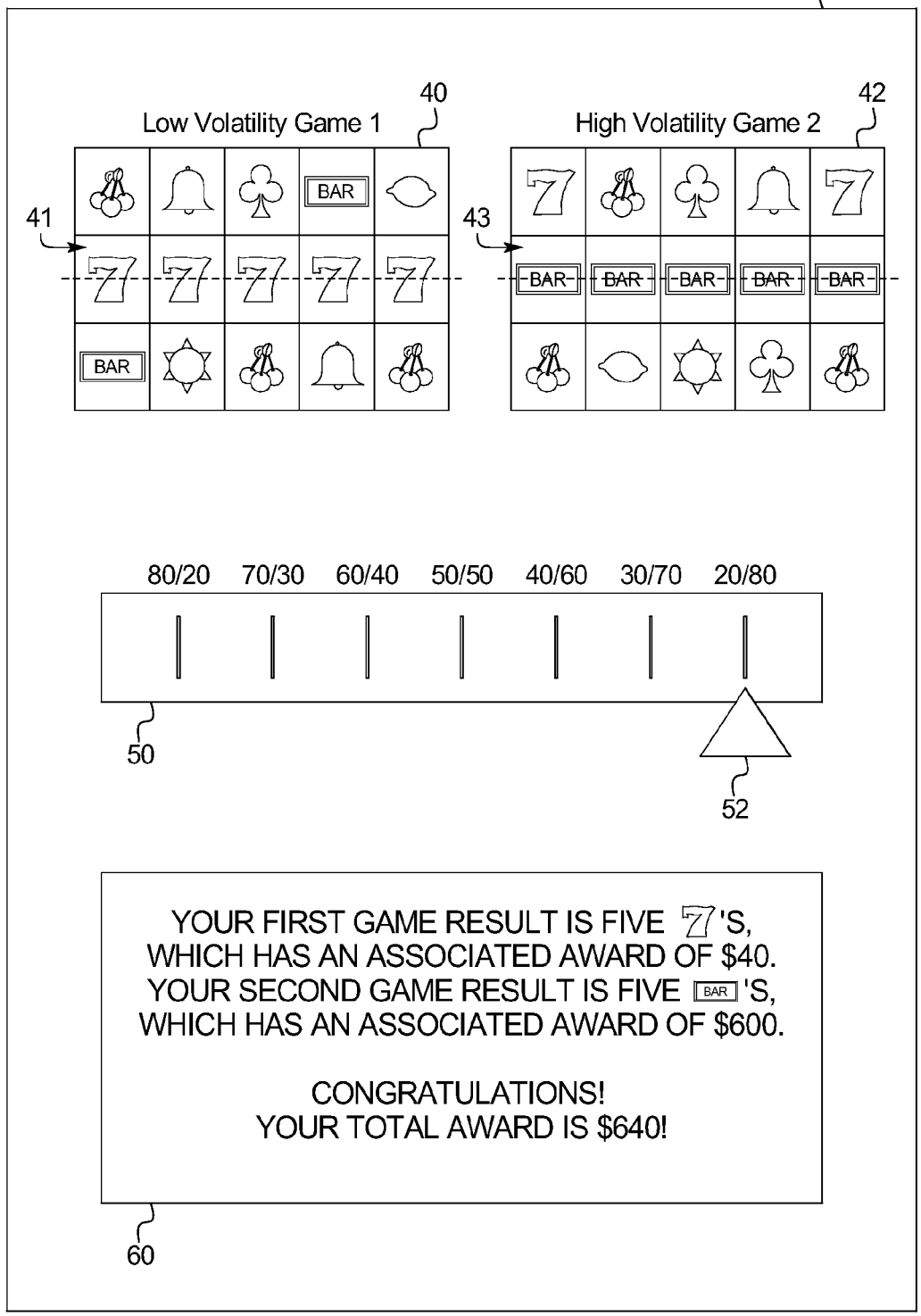

As shown in FIG. 2C, the gaming system displays a first determined game outcome 41 of five seven symbols for the first game 40 and a second determined game outcome 43 of five single bar symbols for the second game 42. The gaming system determines awards associated with the determined game outcomes 41, 43. As shown in FIG. 2C, for the wager allocation amount of $2 for the first game 40, the five seven symbols outcome 41 is associated with an award of $40. Additionally, for the wager allocation amount of $8 for the second game 42, the five single bar symbols outcome 43 is associated with an award of $600. Accordingly, the total award for the determined game outcomes is $640. The gaming system displays, in the indicator 60, appropriate messages such as "YOUR FIRST GAME RESULT IS FIVE SEVEN SYMBOLS, WHICH HAS AN ASSOCIATED AWARD OF $40," "YOUR SECOND GAME RESULT IS FIVE SINGLE BAR SYMBOLS, WHICH HAS AN ASSOCIATED AWARD OF $600," "CONGRATULATIONS!" and "YOUR TOTAL AWARD IS 640!" to the player visually, or through suitable audio or audiovisual displays.

In the various embodiments, two or more of the plurality of linked games have different volatilities. In certain embodiments, two or more of the plurality of linked games have the same average expected payback but have different ranges of awards. For example, one of the linked games has, for a specified wager amount, award payouts ranging from $0 to $5,000, and another of the linked games has, for the same specified wager amount, award payouts ranging from $0 to $10,000. In another such embodiment, two or more of the plurality of linked games have different associated paytables. For example, one of the linked games has a paytable with an average expected payback percentage of 92% and another of the linked games has a paytable with an average expected payback percentage of 91%.

Figure 3A:
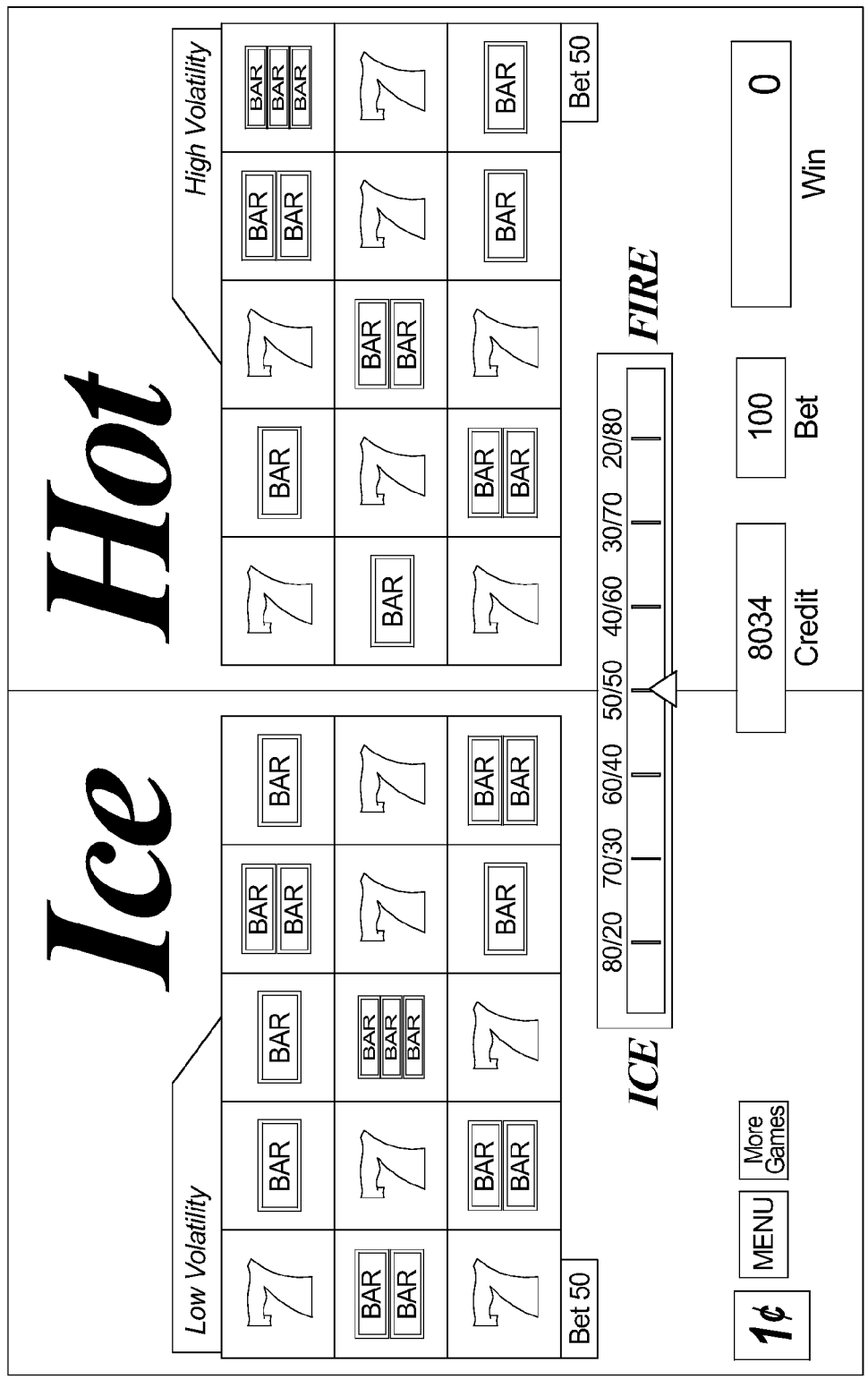
Figure 3C:
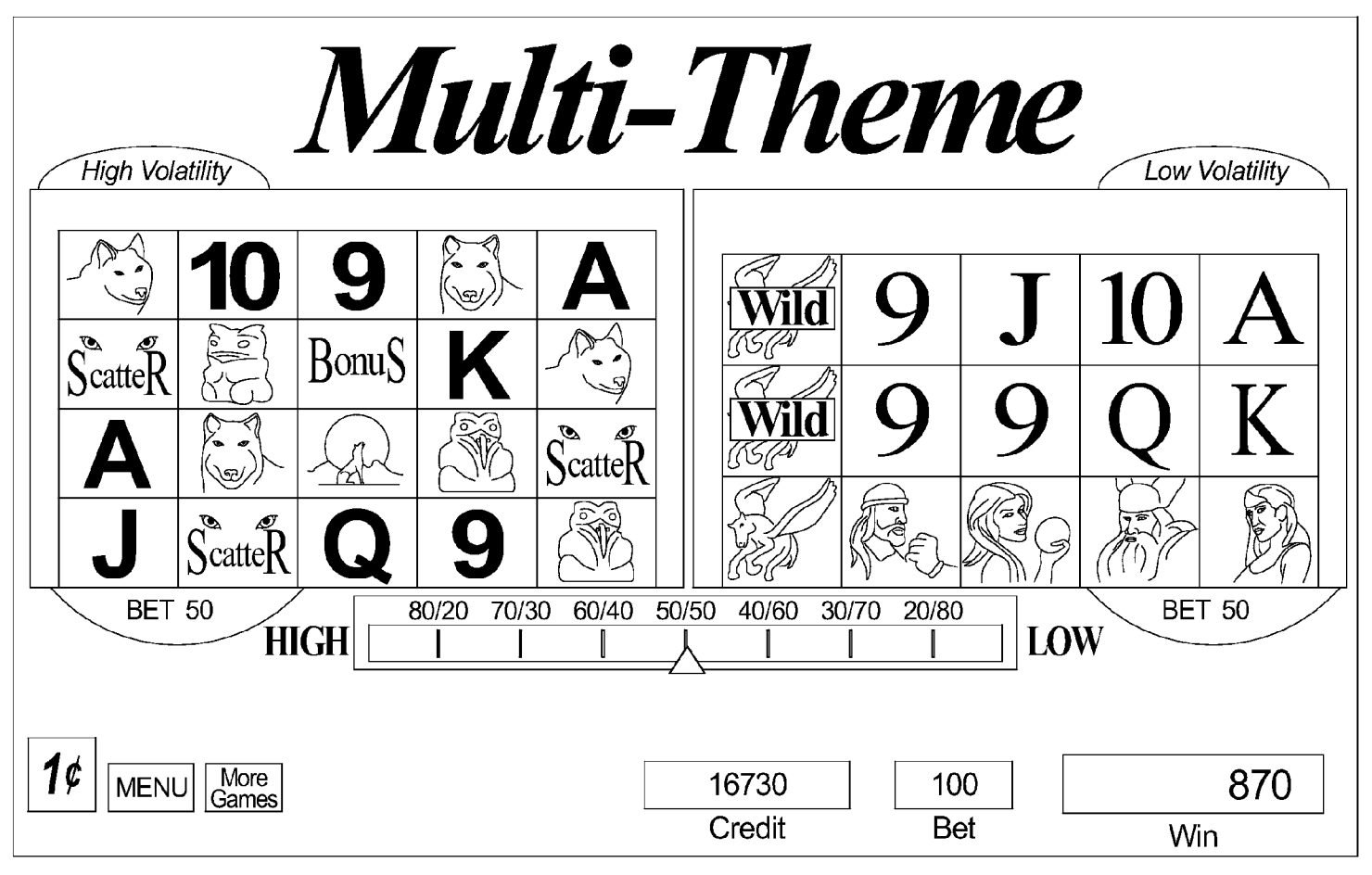
Figure 4A:
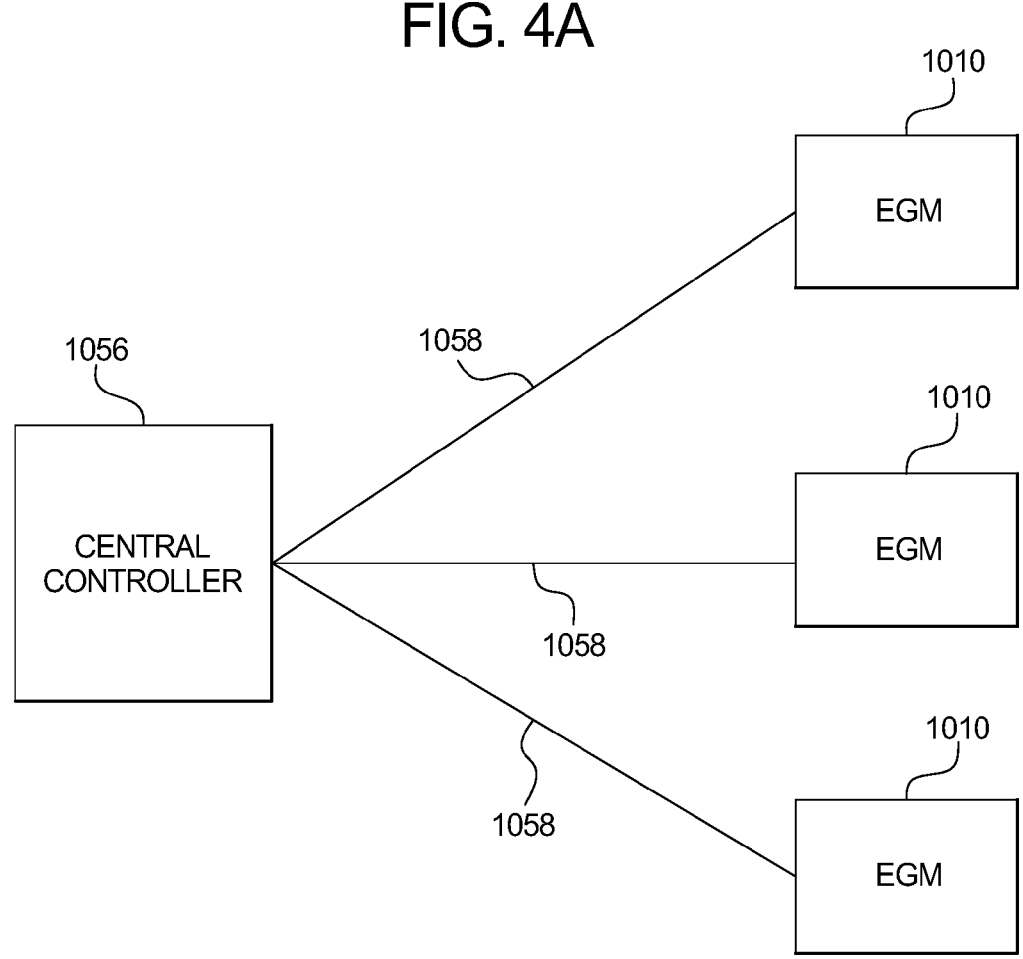
FIG. 4A is a schematic block diagram of one embodiment of a network configuration of the gaming system disclosed herein.
Figure 4B:
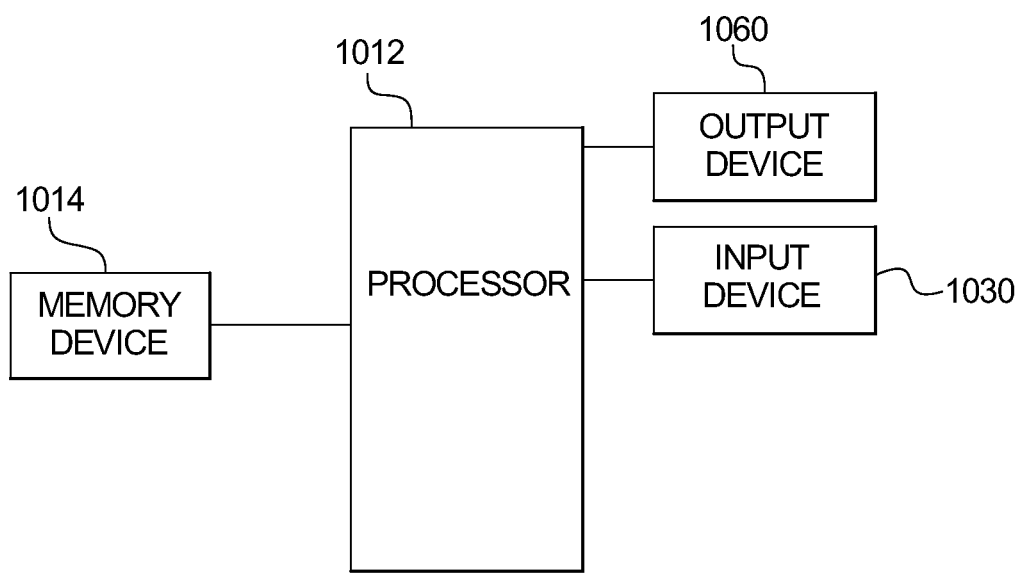
FIG. 4B is a schematic block diagram of one embodiment of an electronic configuration of the gaming system disclosed herein.
Figure 5A:
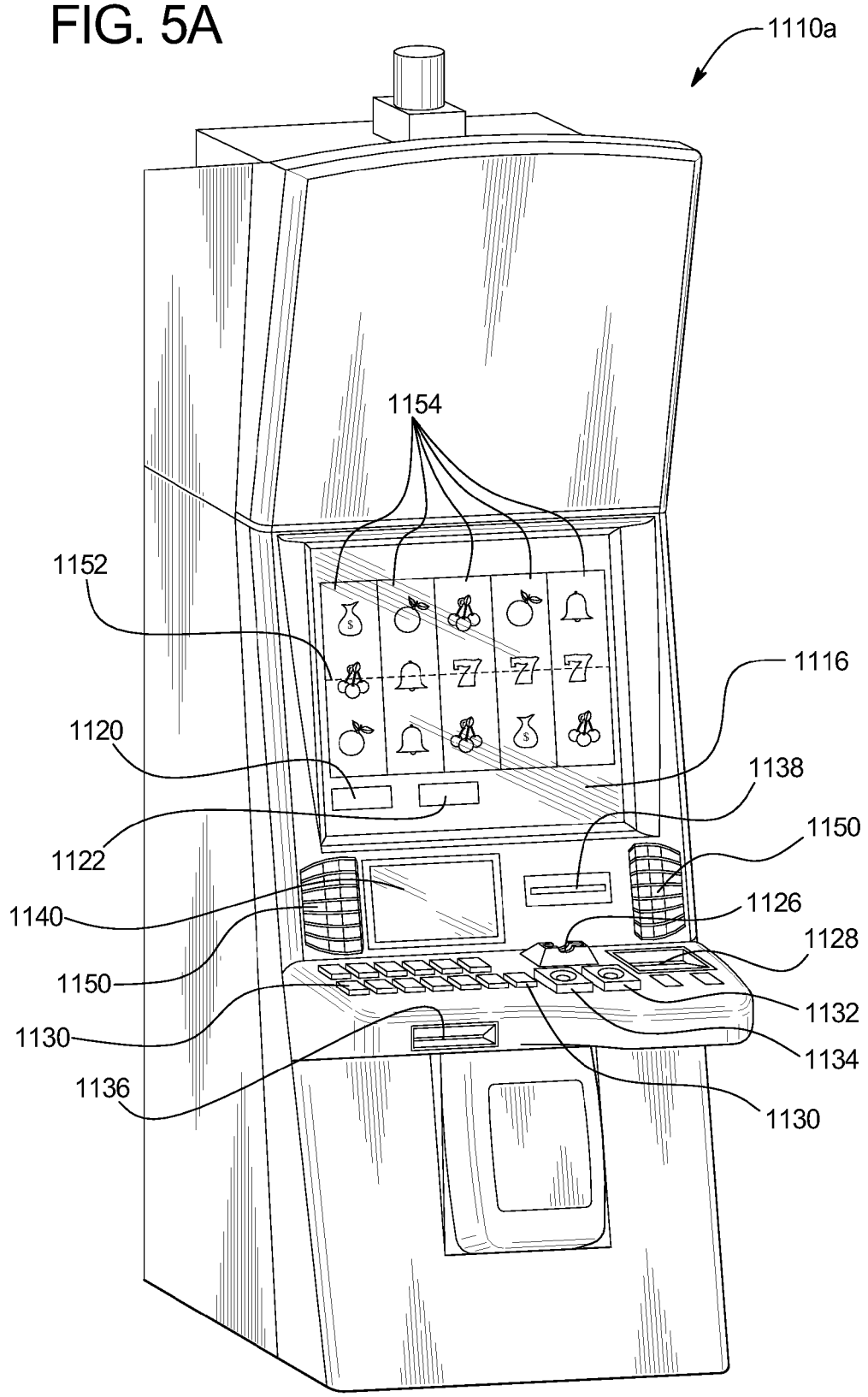
FIGS. 5A and 5B are perspective views of example alternative embodiments of the gaming system disclosed herein.
Figure 5B:
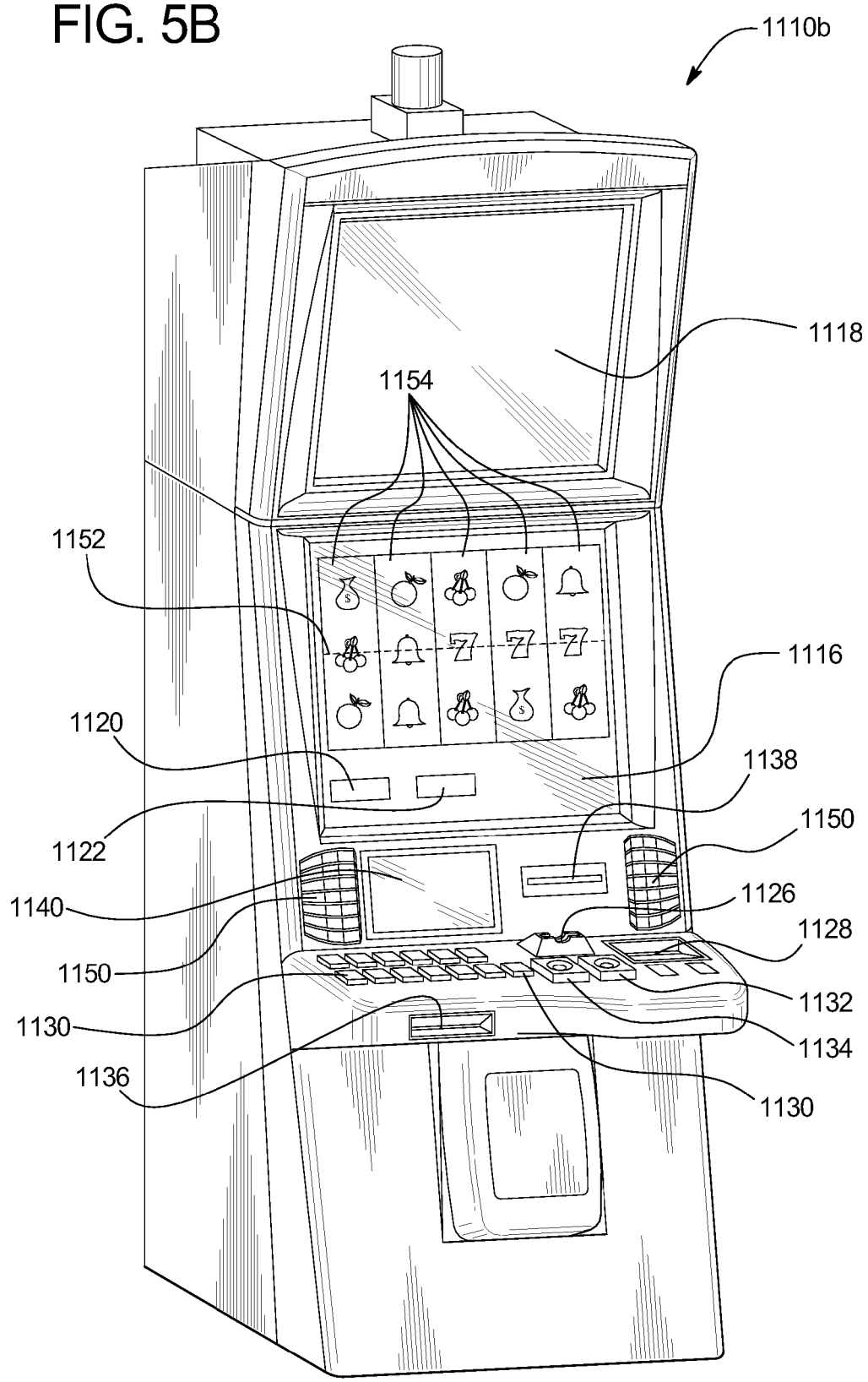

In certain embodiments, a plurality or all of the plurality of linked games are different types, themes, or styles. In other embodiments, a plurality of or all of the plurality of linked games utilize different sets of available symbols. For example, as shown in FIGS. 3A to 3C, the gaming system displays a first slot game which utilizes a first set of available symbols and a second slot game which utilizes a second set of available symbols. Particularly, as shown in FIG. 3C, one of the games utilizes a "Bonus" symbol and another of the games utilizes a "Wild" symbol.

In one embodiment, the plurality of linked games displayed to the player include a plurality of wagered on primary or base games. In another embodiment, the plurality of linked games displayed to the player include at least two wagered on primary or base games and at least one triggered secondary or bonus games. In a further embodiment, the gaming system enables the player to reallocate, to multiple bonus games, portions of a predetermined wager amount associated with the play of multiple primary games. That is, if the gaming system triggers multiple bonus games respectively associated with multiple primary games, the gaming system enables the player to reallocate, to the multiple bonus games, the portions of the predetermined wager amount that the player previously allocated to the multiple primary games. For example, if the player allocated 80% of a predetermined wager amount to a first primary game and 20% of the predetermined wager amount to a second primary game, the gaming machine enables the player to allocate 20% of the predetermined wager amount to a first bonus game associated with the first primary game and 80% of the predetermined wager amount to a second bonus game associated with the second primary game. In this example, the first bonus game is played as if the player originally wagered 20% of the predetermined wager amount on the first primary game and the second bonus game is played as if the player originally wagered 80% of the predetermined wager amount on the second primary game.

Any suitable game, type of game or quantity of games may be implemented as one or more of the linked games disclosed herein. In different embodiments, one or more of the linked games include, but are not limited to: any suitable slot game, any suitable wheel game, any suitable card game, any suitable keno game, any suitable bingo game, any suitable the or dice game, any suitable virtual horse racing game; any suitable offer and acceptance game, any suitable award ladder game, any suitable puzzle-type game, any suitable persistence game, any suitable selection game, any suitable cascading symbols game, any suitable ways to win game, any suitable scatter pay game, any suitable elimination game, any suitable group or community cooperation game, any suitable group or community competition game, or any other suitable type of game. It should be appreciated that regardless of which games or types of games are played, as described above, each displayed game includes a displayed generation of an outcome for that game and the displaying of any award associated with the generated outcome for that game.

In one embodiment as described above, each of the different predetermined wager amounts is less than a sum total of a maximum wager amount of or associated with each of the plurality of linked games. Such an embodiment provides that the gaming system enables the player to select a modified maximum bet button with an associated wager amount that is less than the sum total of the maximum wager amount of or associated with each of the plurality of linked games. In another embodiment, each of the different predetermined wager amounts is greater than a sum total of a minimum wager amount associated with each of the plurality of linked games.

In one embodiment, the gaming system causes at least one display device, such as a primary or central display device or the player's gaming device, to display the plurality of linked games. In another embodiment, the display device which displays the plurality of linked games to the player includes a plurality of display devices which are linked or otherwise configured to function as a single display device. In this embodiment, while the game play area is caused to be displayed by a plurality of display devices, each of the plurality of linked games are still displayed in the single game play area. In another embodiment, in addition or in alternative to each display device or gaming device displaying the plurality of linked games, the gaming system causes one or more community or overhead display devices to display part or all of the plurality of linked games to one or more other players or bystanders either at a gaming establishment or viewing over a network, such as the internee. In another embodiment, in addition or in alternative to each gaming device displaying the plurality of linked games, the gaming system causes one or more internee sites to each display the plurality of linked games such that a player is enabled to log on from a personal web browser. In another such embodiment, the gaming system enables the player to play one or more primary games on one device while viewing the plurality of linked games from another device, or vice-versa. For example, the gaming system enables the player to play one or more primary games (or a plurality of linked games) on a mobile phone while viewing the status of the plurality of linked games (or one or more primary games) on a desktop or laptop computer.

In another embodiment, the gaming system enables a player to allocate a wager amount of a selected wager level amongst a plurality of paylines for different linked games. In this embodiment, the gaming system enables the player to select a quantity of paylines to play for each of the linked game wherein the selection of a wager level for the linked games played allocates the associated wager amount amongst the quantity of paylines selects for each game played.

In another embodiment, rather than enabling the player to select a quantity of paylines to play for each linked game, the gaming system selects the quantity of paylines to play for each linked game based on the player's selected wager level and the player's selected allocation of the wager amount associated with the selected wager level. In this embodiment, the player's allocation of a greater portion of the wager amount of the selected wager level to a first game over a second game results in a greater quantity of paylines activated for the first game over the second game.

In another embodiment, for certain linked games, the gaming system enables a player to allocate a wager amount of a selected wager level amongst a plurality of paylines for different linked games (wherein the selection of a wager level for the linked games played allocates the associated wager amount amongst the quantity of paylines selects for each game played) while for certain other linked games, the gaming system selects the quantity of paylines to play for each linked game based on the player's selected wager level and the player's selected allocation of the wager amount associated with the selected wager level. For example, a division of a wager amount for a selected wager level of 80% for a first game which enables a player to select a quantity of paylines to activate and 20% for a second game which includes a predetermined quantity paylines activated results in more paylines activated in the first game and less wagered on each of the predetermined quantity of paylines of the second game. In this example, a division of a wager amount for a selected wager level of 20% for the first game (which enables a player to select a quantity of paylines to activate) and 80% for a second game (which includes a predetermined quantity paylines activated) results in less paylines activated in the first game and more wagered on each of the predetermined quantity of paylines of the second game.

It should be appreciated that in different embodiments, one or more of:
 i. one or more quantities of linked games available;
 ii. one or more allocation ranges available for a wager amount;
 iii. one or more quantities of allocations available for a wager amount;
 iv. one or more wager amounts available to be placed;
 v. one or more paytables utilized for a play of one or more of the linked games;
 vi. one or more average expected payout percentages of a play of one or more of the linked games;
 vii. one or more awards available for a play of one or more of the linked games;
 viii. one or more ranges of awards available for a play of one or more of the linked games;
 ix. one or more types of awards available for a play of one or more of the linked games;
 x. one or more generated outcomes (or one or more designated generated outcomes) for a play of one or more of the linked games;
 xi. one or more generated outcomes (or one or more designated generated outcomes) associated with an award over a designated value for a play of one or more of the linked games; and
 xii. one or more game play features associated with any play of any game disclosed herein;
 is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 6A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 6B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferro-electric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 6B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internee or intranet).

In various embodiments, the EGM includes one or more input devices. The input devices may include any suitable device that enables an input signal to be produced and received by the at least one processor of the EGM. The example EGM illustrated in FIG. 6B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 7A and 7B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 7A and 7B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 7A and 7B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera; in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 7A and 73 each include a card reader 1138. The card reader is configured to read a player identification card inserted into the card reader.

In various embodiments, the EGM includes one or more output devices. The example EGM illustrated in FIG. 63 includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 7A includes a central display device 1116, a player tracking display 1140, a credit display 1120, and a bet display 1122. The example EGM illustrated in FIG. 7B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 7A and 7B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 7A and 7B each include a plurality of speakers 1150.

In another such embodiment, the EGM provides dynamic sounds coupled with attractive multimedia images displayed on one or more of the display devices to provide an audiovisual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 7A and 7B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 7A and 7B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. Alter one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 7A and 7B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:
   a housing;
   at least one display device supported by the housing;
   a plurality of input devices supported by the housing, said plurality of input devices including:
      (i) an acceptor, and
      (ii) a cashout device;
   at least one processor; and
   at least one memory device which stores a plurality of instructions, which when executed by the at least one processor, cause the at least one processor to operate with the at least one display device and the plurality of input devices to:
      (a) if a physical item is received via the acceptor, establish a credit balance based, at least in part, on a monetary value associated with the received physical item;
      (b) receive an input of one of a plurality of different predetermined wager amounts for a plurality of linked plays of a plurality of games, each of the different predetermined wager amounts being less than a sum total of a maximum wager amount associated with each of the plurality of games;
      (c) after receiving the input of one of the plurality of different predetermined wager amounts, receive an input of an allocation of a portion of the selected predetermined wager amount to each of the plurality of games, wherein a total of the allocated portions equals the selected predetermined wager amount;
      (d) thereafter, for each of the linked plays of the plurality of games:
         (i) determine a game outcome,
         (ii) display the determined game outcome,
         (iii) determine an award associated with the determined game outcome, and
         (iv) display the determined award, wherein the credit balance is increasable based on the determined award; and (e) if a cashout input is received via the cashout device, cause an initiation of any payout associated with the credit balance.

2. The gaming system of claim 1, wherein at least two of the plurality of games are associated with different ranges of awards.

3. The gaming system of claim 1, wherein at least two of the plurality of games are different games.

4. The gaming system of claim 1, wherein at least two of the plurality of games have different average expected payouts.

5. The gaming system of claim 1, wherein at least two of the plurality of games are associated with different paytables.

6. The gaming system of claim 1, wherein receiving the input of the allocation of the portion of the selected predetermined wager amount to each of the plurality of games includes receiving the input of the allocation of the portion of the selected predetermined wager amount to each of the plurality of games with a wager allocation slider.

7. The gaming system of claim 6, wherein, when executed by the at least one processor, the plurality of instructions cause the at least one processor to:
   detect an adjustment of the wager allocation slider; and
   modify at least one of the allocated portions based on the adjustment to the wager allocation slider such that the total of the allocated portions equals the selected predetermined wager amount.

8. The gaming system of claim 1, wherein each of the different predetermined wager amounts is greater than a sum total of a minimum wager amount associated with each of the plurality of games.

9. The gaming system of claim 1, wherein at least two of the linked plays of the plurality of games are selected from the group consisting of: at least two simultaneous plays of the plurality of games, at least two overlapping plays of the plurality of games, and at least two sequential plays of the plurality of games.

10. The gaming system of claim 1, wherein, when executed by the at least one processor, the plurality of instructions cause the at least one processor to receive the input of the allocation of the portion of the selected predetermined wager amount independently from receiving the input of one of the plurality of different predetermined wager amounts.

11. A method of operating a gaming system, said method comprising:
   (a) if a physical item is received via an acceptor, establishing a credit balance based, at least in part, on a monetary value associated with the received physical item;
   (b) receiving an input of one of a plurality of different predetermined wager amounts for a plurality of linked plays of a plurality of games, each of the different predetermined wager amounts being less than a sum total of a maximum wager amount associated with each of the plurality of games;
   (c) after receiving the input of one of the plurality of different predetermined wager amounts, receiving an input of an allocation of a portion of the selected predetermined wager amount to each of the plurality of games, wherein a total of the allocated portions equals the selected predetermined wager amount;
   (d) thereafter, for each of the linked plays of the plurality of games:
      (i) causing at least one processor to execute a plurality of instructions to determine a game outcome,
      (ii) causing at least one display device to display the determined game outcome,
      (iii) causing the at least one processor to execute a plurality of instructions to determine an award associated with the determined game outcome, and
      (iv) causing the at least one display device to display the determined award, wherein the credit balance is increasable based on the determined award; and
   (e) if a cashout input is received via a cashout device, causing an initiation of any payout associated with the credit balance.

12. The method of claim 11, wherein at least two of the plurality of games are associated with different ranges of awards.

13. The method of claim 11, wherein at least two of the plurality of games are different games.

14. The method of claim 11, wherein at least two of the plurality of games have different average expected payouts.

15. The method of claim 11, wherein at least two of the plurality of games are associated with different paytables.

16. The method of claim 11, wherein receiving the input of the allocation of the portion of the selected predetermined wager amount to each of the plurality of games includes receiving the input of the allocation of the portion of the selected predetermined wager amount to each of the plurality of games with a wager allocation slider.

17. The method of claim 16, which includes:
   causing the at least one processor to detect an adjustment of the wager allocation slider; and
   causing the at least one processor to modify at least one of the allocated portions based on the adjustment to the wager allocation slider such that the total of the allocated portions equals the selected predetermined wager amount.

18. The method of claim 11, wherein each of the different predetermined wager amounts is greater than a sum total of a minimum wager amount associated with each of the plurality of games.

19. The method of claim 11, wherein at least two of the linked plays of the plurality of games are selected from the group consisting of: at least two simultaneous plays of the plurality of games, at least two overlapping plays of the plurality of games, and at least two sequential plays of the plurality of games.

20. The method of claim 11, which includes receiving the input of the allocation of the portion of the selected predetermined wager amount independently from receiving the input of one of the plurality of different predetermined wager amounts.

21. A non-transitory computer readable medium including a plurality of instructions, which when executed by at least one processor, cause the at least one processor to:
   (a) receive an input of one of a plurality of different predetermined wager amounts for a plurality of linked plays of a plurality of games, each of the different predetermined wager amounts being less than a sum total of a maximum wager amount associated with each of the plurality of games;
   (b) after receiving the input of one of the plurality of different predetermined wager amounts, receive an input of an allocation of a portion of the selected predetermined wager amount to each of the plurality of games, wherein a total of the allocated portions equals the selected predetermined wager amount; and (c) thereafter, for each of the linked plays of the plurality of games:
(i) determine a game outcome,
(ii) cause at least one display device to display the determined game outcome,
(iii) determine an award associated with the determined game outcome, and
(iv) cause the at least one display device to display the determined award, a credit balance is increasable based on the determined award, said credit balance being increasable via an acceptor of a physical item associated with a monetary value, and said credit balance being decreasable via a cashout device.

22. The non-transitory computer readable medium of claim 21, wherein at least two of the plurality of games are associated with different ranges of awards.

23. The non-transitory computer readable medium of claim 21, wherein at least two of the plurality of games are different games.

24. The non-transitory computer readable medium of claim 21, wherein at least two of the plurality of games have different average expected payouts.

25. The non-transitory computer readable medium of claim 21, wherein at least two of the plurality of games are associated with different paytables.

26. The non-transitory computer readable medium of claim 21, wherein receiving the input of the allocation of the portion of the selected predetermined wager amount to each of the plurality of games includes receiving the input of the allocation of the portion of the selected predetermined wager amount to each of the plurality of games with a wager allocation slider.

27. The non-transitory computer readable medium of claim 26, wherein when executed by the at least one processor, the plurality of instructions cause the at least one processor to:
detect an adjustment of the wager allocation slider; and
modify at least one of the allocated portions based on the adjustment to the wager allocation slider such that the total of the allocated portions equals the selected predetermined wager amount.

28. The non-transitory computer readable medium of claim 21, wherein each of the different predetermined wager amounts is greater than a sum total of a minimum wager amount associated with each of the plurality of games.

29. The non-transitory computer readable medium of claim 21, wherein at least two of the linked plays of the plurality of games are selected from the group consisting of: at least two simultaneous plays of the plurality of games, at least two overlapping plays of the plurality of games, and at least two sequential plays of the plurality of games.

30. The non-transitory computer readable medium of claim 21, wherein, when executed by the at least one processor, the plurality of instructions cause the at least one processor to receive the input of the allocation of the portion of the selected predetermined wager amount independently from receiving the input of one of the plurality of different predetermined wager amounts.

* * * * *